United States Patent [19]

Peillex

[11] 3,721,995
[45] Mar. 27, 1973

[54] TRANSPARENT PROTECTIVE SCREEN
[75] Inventor: Paul Peillex, Thonon, France
[73] Assignee: Arisara Investment Corporation NV, Curacao, Netherlands Antilles
[22] Filed: Apr. 12, 1971
[21] Appl. No.: 133,096

[52] U.S. Cl. .................................................... 2/10
[51] Int. Cl. ............................................. A61f 9/04
[58] Field of Search .................... 2/8, 9, 10, 14 R

[56] References Cited

UNITED STATES PATENTS

| | | | |
|---|---|---|---|
| 1,994,103 | 3/1935 | Huey | 2/8 |
| 3,159,844 | 12/1964 | Haboush | 2/8 |
| 2,417,883 | 3/1947 | Oschin | 2/8 X |
| 2,423,320 | 7/1947 | Hurley | 2/8 |

FOREIGN PATENTS OR APPLICATIONS 1,108,504   8/1955   France ........................................ 2/9

Primary Examiner—H. Hampton Hunter
Attorney—Young & Thompson

[57] ABSTRACT

The invention deals with a transparent protective shield which comprises an element of a transparent material partly housed in a support. The free portion of said element is intended to be located in front of a sighting field. An actuating device drives the transparent element in displacement relative to the support so that it passes over scraping lips which clean said element.

6 Claims, 5 Drawing Figures

INVENTOR
PAUL PEILLEX
BY Young & Thompson
ATTYS

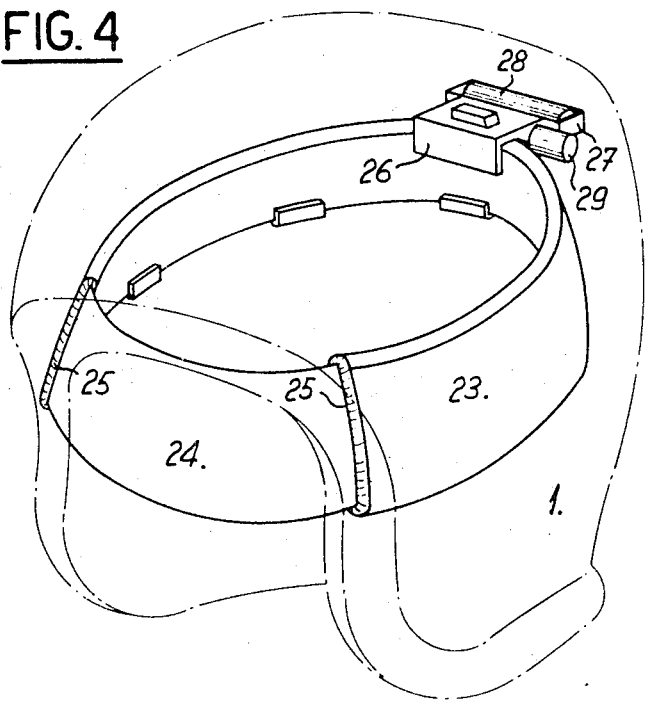
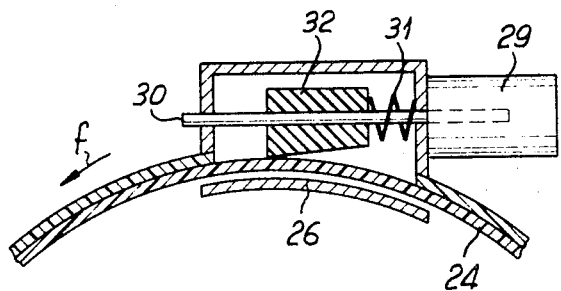

TRANSPARENT PROTECTIVE SCREEN

The object of the present invention is to obtain an automatic cleaning of a transparent protection screen without hindering or limiting the sight.

The transparent protective screen according to the invention is characterized by the fact that it comprises a piece of transparent material partly housed within a support and a free portion of which is intended to be in front of a sighting field and by the fact that it comprises a driving device causing relative displacement between the piece of transparent material and the support.

The attached drawings show schematicaly and by way of example different embodiments of a protective screen according to the invention when incorporated in a helmet.

FIG. 4 shows a screen the transparent piece of which is a strip driven in successive steps.

FIG. 5 shows a detail of the driving of the strip shown in FIG. 4.

Figure 1:
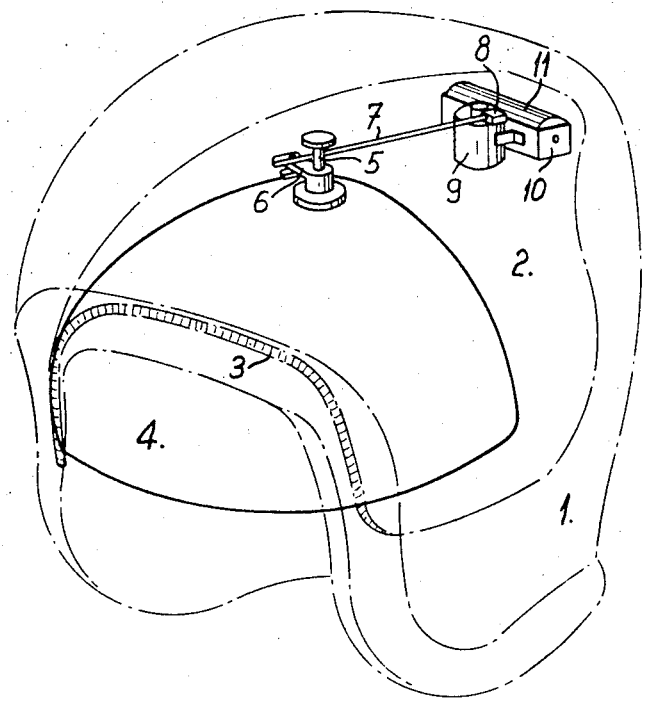
FIG. 1 shows a screen the transparent piece of which is driven with a reciprocal movement.

The transparent protective shield is thus partly incorporated within its support, for example a protective helmet of which it connects the two lateral sides while forming a transparent screen before the eyes of the wearer or before a movie camera or a photographic apparatus on which the support would be fastened. This screen comprises a piece of transparent material, preferably flexible and unbreakable or of safety glass. The free portion of this piece constitutes the sighting field whereas the remaining part of it is located within the support. In fact on each side of the sighting field the support comprises a slot, the edges of which are provided with scraping lips, in which the transparent piece is placed.

This transparent piece may completely surround the support or on the contrary be interrupted. It is however always long enough that through relative displacements with respect to the support the whole of the sighting field may be cleaned by passage between the lips provided on the support.

The movement of the transparent piece with respect to the support may be continuous, always in the same direction when the piece is closed on itself or oscillating when the piece does not completely surround the support.

During these displacements the scraping lips mounted on the support and between which the transparent piece is clamped act as scrapers which remove water, dirt and so on which may have collected on the transparent piece.

It is evident that the transparent piece may be planar or curved or also curved along two directions and is thus able to be deformed, through its own flexibility or softness, during its displacements to adapt to the shape of the slide provided in the support. This permits one particularly to make provision for the fact that the shape of the helmet has the shape of a head that is not circular.

This transparent piece may be colored or tinted, particularly in order to absorb the sunrays, or even be optically treated for example in a way to polarize the light passing through it.

Finally the driving of the transparent piece in its displacement with respect to the support may be manual, by means of a driving member which could emerge from of the support, or automatic for example by means of a small electric motor mounted on the support and fed either by a battery or an accumulator also incorporated within the support, or even by an independent batery.

The driving may be effected by means of the said motor, either by friction of the strip against a driving roller or if the transparent strip has perforations by meshing of these perforations with a pinion driven by the motor.

This new screen, easy to fabricate and of a low net cost, permits an efficient and rapid self-cleaning which is made automatic.

The main utilization fields at present for the transparent protective screen are:

The incorporation within a protective helmet or on a support on the head of a person in order to realize sports-glasses which are self-cleaning.

The mounting of a support on a movie camera or on a apparatus which enables one to protect the objective from the weather.

In the following are described by way of example and referring to the attached drawings different variants of the incorporation of the protective screen into a skier or motorbikedriver helmet The helmet 1 shown in FIG. 1 is provided with a false helmet or internal helmet 2 constituting the support of the screen.

The helmet 2 is fixed in a well known manner within the helmet 1. A lip of plastic material 3 is directly moulded on the support 2 and surrounds the portion of the helmet 1 which is cut out to uncover the eyes of the wearer.

The transparent element of the screen is constituted here by a spherical portion 4 of transparent plastic material. This portion 4 is mounted within the support 2 in order to be able to effect angular displacements around an axis 5 of an amplitude corresponding approximately to the length of the transparent portion emerging from the support 2 between the two opposed edges of the lip 3.

The driving of the transparent spherical portion 4 is effected by means of the lever 6 fastened on the axle 5 and connected through the control rod 7 to an eccentric 8. This eccentric 8 is fast with the axle of an electrical motor 9 fastened on a housing 10 in which current feeding batteries 11 for the motor are located. This housing 10 is itself fastened on the support 2.

The transparent shield 4 may be driven in angular reciprocal displacements. It is evident that an interrupter (not shown) fastened on the helmet 1 may be provided in the supply circuit of the motor to start it or to stop it.

Figure 2:
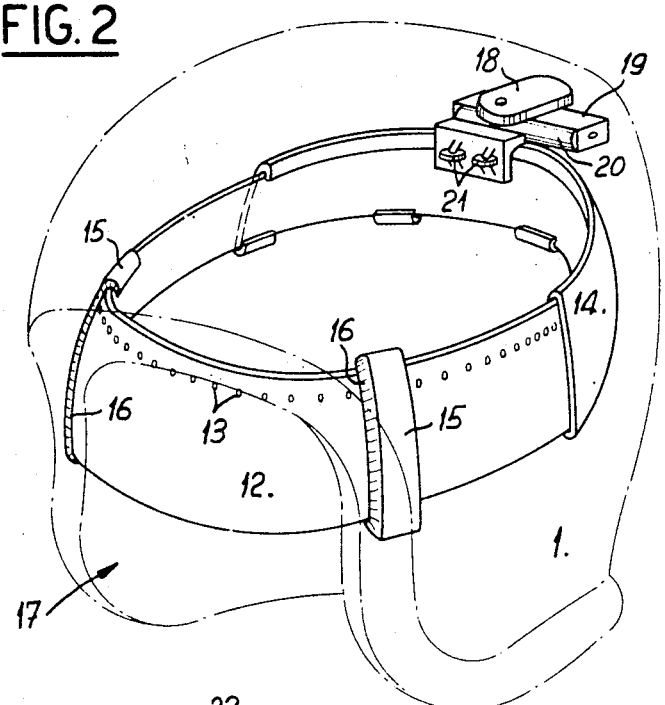
FIG. 2 shows a screen the transparent piece of which is driven in continuous rotation.
Figure 3:
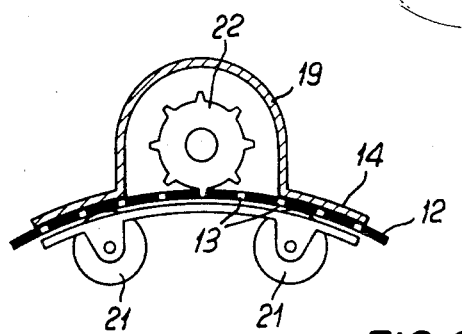
FIG. 3 shows a detail of the driving of the screen shown in FIG. 2.

In the variant shown in FIGS. 2 and 3 the transparent shield is constituted by a strip of plastic material 12 which is supple and transparent. The upper edge of this strip 12 is provided with perforations 13 evenly spaced. This strip 12 is continuous and closed on itself.

The strip 12 is slidingly mounted in a support comprising a slide 14. This slide is mounted by any suitable known means in the helmet 1 in its rear part. This slide 14 may be of supple plastic material to enable, through its deformation, the rapid mounting and dismantling of a strip 12.

The support comprises further two frontal guides 15 comprising moulded lips 16. These frontal guides 15 are mounted in the helmet in the immediate proximity of the face opening 17 of that helmet.

The strip 12, which matches the inside of the helmet 1, is guided by the slide 14 and the guides 15 and may be driven in displacement with respect to the helmet. Here also the strip 12 is driven by an electrical motor 18. This motor is mounted in a housing 19 in which current feeding batteries 20 are located. This housing 19 is fastened on the helmet 1 or on the slide 14. Pressing rollers 21 are provided on this housing and apply the strip 12 against the slide 14. The toothed wheel 22 is driven by the motor 18 and meshes with the perforations 13 of the strip 12.

In the variant shown in FIGS. 4 and 5 the support is constituted by a slide 23 fastened within the helmet 1. This slide extends over the whole length of the internal periphery of the helmet 1 and the transparent strip 24 is thus guided over all its length but for the portion used to be sighted through.

The two opposite ends of the slide 23 are provided with scraping lips 25.

The driving device of the strip 24 comprises the support 26 carrying a housing 27 for the batteries 28. These batteries feed through the intermediary of a known vibrating device (not shown) an electromagnet 29. The plunger 30 of this electromagnet is subjected to the return action of a spring 31 and driven in reciprocal movements due to successive pulses delivered to the electromagnet.

The plunger 30 comprises a rubbing member 32 entering in contact with the screen at each return stroke of the plunger 30 which causes its driving step by step in the direction of the arrow f.

It is evident that numerous other variants could be realized without departing from the scope of the invention.

I claim:

1. A helmet having a transparent protective shield in the form of a continuous closed loop of transparent strip material disposed within the helmet and passing about the head of the wearer and in front of the eyes of the wearer, power means for continuously circulating the loop about the interior of the helmet so that different portions of the loop pass in one direction before the eyes of the wearer, and means carried by the helmet to clean the transparent loop during its movement relative to the helmet.

2. A helmet as claimed in claim 1, said cleaning means comprising lips clamping the transparent loop between them.

3. A helmet as claimed in claim 1, said power means comprising rotary means engaging in spaced perforations in said loop.

4. A helmet as claimed in claim 1, said power means comprising reciprocatory means engaging with the loop to drive the loop in said one direction.

5. A helmet as claimed in claim 1, said power means comprising an electric motor carried by the helmet, and batteries carried by the helmet for driving said electric motor.

6. A helmet as claimed in claim 1, said transparent loop being flexible.

* * * * *